United States Patent [19]

Aihara et al.

[11] Patent Number: 5,330,791
[45] Date of Patent: Jul. 19, 1994

[54] METHOD OF RECLAIMING PHOSPHOR

[75] Inventors: Yoshikatsu Aihara; Tomokazu Suzuki; Yoshiaki Shizuki; Shoichi Bando; Katsunori Uchimura, all of Anan, Japan

[73] Assignee: Nichia Kagaku Kogyo K.K., Tokushima, Japan

[21] Appl. No.: 47,072

[22] Filed: Apr. 16, 1993

Related U.S. Application Data

[63] Continuation of Ser. No. 587,092, Sep. 24, 1990, abandoned.

[30] Foreign Application Priority Data

Apr. 21, 1990 [JP] Japan .................................. 2-105906

[51] Int. Cl.$^5$ .............................................. C09K 11/01
[52] U.S. Cl. ........................... 427/215; 252/301.4 R; 252/301.4 S; 252/301.6 S; 427/64; 427/68
[58] Field of Search ................ 252/301.4 R, 301.4 S, 252/301.6 S; 427/215, 218, 219, 64, 68

[56] References Cited

U.S. PATENT DOCUMENTS

| | | | |
|---|---|---|---|
| 3,647,522 | 3/1972 | Single | 252/301.6 S |
| 3,763,050 | 10/1973 | Dikhoff et al. | 252/301.6 S |

FOREIGN PATENT DOCUMENTS 0338911 10/1989 European Pat. Off. .

OTHER PUBLICATIONS

Patent Abstracts of Japan vol. 4, No. 151 (C-028) Oct. 23, 1980 & JP-A-55 094 986 (Hitachi Ltd) Jul. 1980.
Patent Abstracts of Japan, vol. 2, No. 51 (F-026) Apr. 12, 1978 & JP-A-53 015 032 (Tokyo Sshsibaura Elec. Ltd) May 22, 1978.
Patent Abstracts of Japan vol. 2, No. 59 (C-012) Apr. 27, 1978 & JP-A-53 018 489 (Hitachi Ltd) Feb. 20, 1978.
Patent Abstracts of Japan vol. 6, No. 226 (E-141) [1104], Nov. 11, 1982 & JP-A-57 130 337 (Tokyo Shibaura Denki K.K.) Aug. 12, 1982.
Patent Abstracts of Japan, vol. 5, No. 41 (C-047), Mar. 18, 1981 & JP-A-55 164 283 (Nichia Kagaku Kogyo) Dec. 21, 1980.

*Primary Examiner*—Jack Cooper
*Attorney, Agent, or Firm*—Nixon & Vanderhye

[57] ABSTRACT

A method of reclaiming a phosphor from a recovered phosphor slurry containing carbon, a bichromate, and polyvinyl alcohol, comprises, (a) a decomposition treatment step of adding an alkali to the recovered phosphor slurry after the slurry is heated to prepare a phosphor suspension having an alkali concentration of 0.5N or less in the slurry, and adding an oxidizing agent in an amount of 1.0 to 20.0 wt % with respect to a dry solid component of the suspension, (b) a weak acid treatment step of separating a phosphor from the suspension, and adding a weak acid to a suspension obtained by adding water to the separated phosphor, thereby adjusting a pH to be 3.0 to 5.0, and (c) a surface treatment step of treating the surface of the phosphor separated from the suspension.

6 Claims, No Drawings

METHOD OF RECLAIMING PHOSPHOR

This is a continuation of application Ser. No. 07/587,092, filed Sep. 24, 1990, now abandoned.

BACKGROUND OF THE INVENTION

1. Field of the Invention

The present invention relates to a method of regenerating a phosphor from a recovered phosphor slurry containing carbon, a bichromate, and polyvinyl alcohol and, more particularly, to a method of reclaiming a phosphor for a cathode-ray tube.

2. Description of the Related Art

In general, red, blue, and green emitting phosphors are aligned as dots or stripes on the inner surface of a faceplate to form a phosphor screen of a color cathode-ray tube. Examples of the color cathode-ray tube phosphor are a copper-activated zinc sulfide phosphor, a copper and gold-coactivated zinc sulfide phosphor as a green emitting phosphor, a silver-activated zinc sulfide phosphor as a blue emitting phosphor, and a europium-activated yttrium oxide sulfide phosphor and a europium-activated yttrium oxide phosphor as a red emitting phosphor.

A typical example of a method of forming a phosphor screen is a slurry method. In this slurry method, a phosphor is dispersed in a photosensitive aqueous solution mixture consisting of polyvinyl alcohol (PVA), ammonium bichromate (ADC), and a surfactant to form a phosphor slurry, and the slurry is uniformly coated on the inner surface of a faceplate of a color cathode-ray tube by using, e.g., a spin coater. The coated slurry is exposed through a shadow mask to form a predetermined pattern, a portion of the phosphor in the exposed portion of the slurry is fixed on the faceplate, and the remaining phosphor slurry is washed away. A series of these steps are repeatedly performed for each of blue, green, and red emitting phosphors, thereby forming a phosphor screen. In a so-called black matrix type cathode-ray tube, dots or stripes of a black substance such as carbon or black chromium are formed on the inner surface of a faceplate beforehand, and then the above steps are repeatedly performed to form a phosphor screen.

Since an amount of a phosphor washed away in the above slurry method is about 70% or more of a used phosphor amount, a washed away portion of the phosphor should be normally recovered and reused. In particular, it is important to reuse a phosphor containing an expensive rare earth element as in a yttrium-based red emitting phosphor.

A recovered phosphor slurry, however, contains not only phosphor slurry components such as ADC and PVA but also extraneous materials such as a lubricating oil of, e.g., a spin coater or a recovering machine, a black substance such as carbon or black chromium and a phosphor of another color emitting peeled from a formed phosphor screen, foreign substances, and dust. For example, a red emitting phosphor slurry which is recovered after the last coating step of the slurry method contains, in addition to slurry components such as a red emitting phosphor, PVA and ADC, a small amount of extraneous materials such as carbon, green and blue emitting phosphors, and an oil component. When such a recovered slurry is directly reused, PVA is solidified, an oil component having volatility volatilizes upon formation of a phosphor screen, or an oil component not having volatility causes nonuniform coating. Therefore, it is difficult to form an uniform phosphor screen. In addition, since other color emitting phosphors and a black substance are contained, a color tone and image quality are degraded. For this reason, as a recovered phosphor reclaiming method capable of removing these undesired materials, various types of methods have been conventionally proposed.

For example, Japanese Patent Application No. 47-557 discloses a method in which an alkali solution having a pH of 12 or more and a hypohalogenous acid salt such as sodium hypochlorite (NaOCl) are added to a recovered phosphor slurry, a rare earth phosphor is separated from a suspension obtained by heating the resultant phosphor slurry and is washed with water, thereby reclaiming a phosphor. According to this method, however, since a large amount of NaOCl is used at a high alkali concentration, the surface of a phosphor is significantly oxidized, and the brightness of a reclaimed phosphor is significantly decreased.

Published Unexamined Japanese Patent Application No. 53-17587 or 53-30486 discloses a method in which an alkali is added to a recovered phosphor slurry, and the slurry is washed with water and a phosphor is separated to be recovered after the slurry is heated up to 60° C. Since, however, silica or the like which is coated on the surface of a phosphor is dissolved or peeled together with, e.g., PVA by an alkali treatment, dispersibility of a phosphor in a phosphor slurry and its adhesive strength with respect to a faceplate are reduced.

In addition, Published Unexamined Japanese Patent Application No. 53-18489 discloses a method in which an alkali-treated phosphor is baked at 200° C. to 400° C., dissolved or peeled silica is adhered on the phosphor again, and the phosphor is washed with water and separated to be recovered. Although a reduction in adhesive strength of the phosphor reclaimed by this method is improved, however, its dispersibility is still unsatisfactory.

SUMMARY OF THE INVENTION

It is an object of the present invention to provide a method of reclaiming a recovered phosphor, which can obtain a phosphor having good dispersibility and coating characteristics, can form a uniform phosphor screen, and hardly causes a brightness reduction.

According to the present invention, there is provided a method of reclaiming a phosphor from a recovered phosphor slurry containing carbon, bichromate salt, and polyvinyl alcohol, comprising: (a) a decomposition treatment step of adding an alkali to the recovered phosphor slurry after the slurry is heated to prepare a warm phosphor suspension having an alkali concentration of 0.5N or less in the slurry, and adding an oxidizing agent in an amount of 1.0 to 20.0 wt % with respect to a dry solid component of the suspension; (b) a weak acid treatment step of separating a phosphor from the suspension, and adding a weak acid to the suspension obtained by adding water to the separated phosphor, thereby adjusting a pH to be 3.0 to 5.0; and (c) a surface treatment step of treating the surface of the phosphor separated from the suspension.

According to the present invention, in the decomposition step, PVA, ADC, and the like covering the surface of a recovered phosphor are softened by heating and the alkali treatment, a phosphor is dispersed and the softened PVA, ADC, and the like are dissolved, and the PVA, ADC, and the like softened by the alkali treatment can be decomposed or peeled by adding an oxidizing agent. In the weak acid treatment step, an oxide or sulfide produced on the surface of the phosphor by the oxidizing agent or an unnecessary luminescent component can be removed. In addition, in the surface treatment step, dispersibility and coating properties of the phosphor can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

A method of reclaiming a phosphor according to the present invention is a method of reclaiming a phosphor from a recovered phosphor slurry containing carbon, bichromate salt, and polyvinyl alcohol, and includes the following three steps.

That is, the first step is treating to decompose by separating a phosphor from a recovered phosphor slurry containing extraneous materials such as carbon, a bichromate, and PVA. The second step is treating with a weak acid by removing an oxide or a sulfate formed on the surface of the phosphor by an oxidizing agent used in the decomposition treatment step. The third step is treating the surface of the phosphor to improve dispersibility and coating properties of the phosphor.

In the decomposition treatment step, an alkali is added to a recovered phosphor slurry after the slurry is heated to prepare a phosphor suspension having an alkali concentration of 0.5N or less in the slurry, and an oxidizing agent is added in an amount of 1.0 to 20.0 wt % with respect to a dry solid component in the suspension.

Most preferably, the phosphor slurry is heated up to 70° C. or more in order to soften PVA, ADC, and the like fixed to the recovered emitting phosphor.

Examples of an alkali are NaOH, KOH, LiOH, and $NH_4OH$. An addition amount of an alkali is preferably 1.0 wt % or more, and more preferably, 2.0 wt % or more with respect to a dry solid component in the phosphor slurry.

A dry solid component amount of a phosphor slurry except for a phosphor normally reaches 1 to 20 wt %. Therefore, if an addition amount of an alkali is less than 1.0 wt %, it may be difficult to satisfactorily decompose extraneous materials in the phosphor slurry. If the alkali concentration exceeds 0.5N, an oxidizing effect obtained when an oxidizing agent is added during the alkali treatment may be too strong. As a result, brightness and coating characteristics tend to be degraded.

If an addition amount of the oxidizing agent is less than 1.0 wt %, it may be difficult to satisfactorily peel PVA and the like coated on the phosphor surface. If the addition amount is 20.0 wt % or more, a large amount of an oxide may be produced on the phosphor surface since an oxidizing effect may be too strong, thereby brightness and coating properties tend to be degraded. This addition amount is more preferably 3 to 10 wt %.

Examples of the oxidizing agent are $Na_2S_2O_8$, $H_2O_2$, NaOCl, $C_3H_3N_3O_3$, $C_3Cl_2NaN_3O_3$, and $C_3Cl_3N_3O_3$. Preferably, isocyanuric acid ($C_3H_3N_3O_3$) can be used. Especially when a mixing amount of PVA, ADC, and the like is large, chlorinated isocyanuric acid (e.g. $C_3Cl_2NaN_3O_3$ and $C_3Cl_3N_3O_3$) can be effectively used. When a zinc sulfide-based phosphor is to be reclaimed, however, it is desired not to use $C_3Cl_2NaN_3O_3$ and $C_3Cl_3N_3O_3$. This is because $C_3Cl_2NaN_3O_3$ and $C_3Cl_3N_3O_3$ having a strong oxidizing force with respect to a phosphor significantly dissolve a zinc sulfide phosphor, thereby reducing the brightness of the zinc sulfide phosphor. When a zinc sulfide phosphor is mixed in a recovered rare earth phosphor slurry, $C_3Cl_3N_3O_3$ can be effectively used in order to suppress its luminescence. When 10 wt % or more of an oxidizing agent except for isocyanuric acid series oxidizing agent are added, the brightness of a recovered emitting phosphor is significantly reduced. However, even if 20 wt % or more of the isocyanuric acid series oxidizing agent are added, a reduction in brightness is small.

In the weak acid treatment step, a phosphor is separated from a decomposed suspension, and a weak acid is added to a suspension obtained by adding water to the separated phosphor, thereby adjusting a pH to be 3.0 to 5.0.

Examples of a weak acid are diluted sulfuric acid, diluted hydrochloric acid, and concentrated acetic acid. In particular, concentrated acetic acid is preferably used.

In order to reclaim a zinc sulfide phosphor, if the pH of a suspension is 3.0 or less, dissolution of the zinc sulfide phosphor is significant to reduce brightness. When a rare earth phosphor containing a zinc sulfide phosphor is to be reclaimed, a pH is preferably adjusted to be 3.0 to 4.0 in order to dissolve the zinc sulfide phosphor.

In the surface treatment step, preferably, a water-soluble compound containing at least one element selected from the group consisting of Zn, Al, and alkali earth metals and at least one coating compound selected from the group consisting of colloidal silica, alumina sol, and titania sol, each having a grain size of 50 nm or less, are added to a suspension containing a phosphor, which is washed well with water after it is treated with a weak acid, to adjust its pH to be 6.5 to 7.5, thereby coating the coprecipitated compounds on the phosphor surface. Alternatively, after a water-soluble monomer such as acrylic acid or methacrylic acid is added to the above suspension, a polymerization initiator such as ammonium persulfate may be added to coat polyacrylic acid or polymethacrylic acid on the phosphor surface.

In the surface treatment step, an amount of a compound to be coated on the phosphor surface, e.g., colloidal silica is preferably about 0.005 to 1.5 parts by weight, and more preferably, about 0.01 to 0.5 parts by weight with respect to 100 parts by weight of the phosphor. If the addition amount is less than 0.005 parts by weight, adhesive properties of a reclaimed phosphor to a faceplate tend to be unsatisfactory. If the amount exceeds 1.5 parts by weight, dispersibility tends to be degraded. In either case, it may be difficult to obtain an uniform phosphor screen. Assuming that an addition amount of the above water-soluble compound of a metal is represented by an amount of metal ions, it is preferably about 0.003 to 0.5 wt %, and more preferably, about 0.01 to 0.1 parts by weight with respect to 100 parts by weight of a phosphor. Examples of the metal compound are zinc sulfate, zinc nitrate, aluminum sulfate, aluminum nitrate, calcium nitrate, magnesium nitrate, and strontium nitrate.

A commercially available colloidal silica having a grain size of 50 nm or less, e.g., Ludox AM (available from Du Pont de Nemours & Co. Inc.) and Snowtex BK and Snowtex AM (available from NISSAN Chemical Co.) can be used as colloidal silica, Alumina Sol 520 (available from NISSAN Chemical Co.) can be used as alumina sol, and titanium sol can be used. In addition, commercially available ultrafine powders having a grain size of 50 nm or less of silica, alumina, and titania such as Titanium Dioxide P25 (available from Aerozil Co.) can be used. When such an ultrafine powder is to be used, the ultrafine powder should be suspended in water to prepare a suspension having a pH of 10 or more, and the suspension is milled to obtain a colloidal or sol material. If the grain size of a powder exceeds 50 nm, dispersibility of a phosphor tends to be degraded. Therefore, a powder having a grain size of 50 nm or less is preferably selected.

When a phosphor to be reclaimed is a phosphor attached with a pigment, the pigment is partially peeled in the first decomposition treatment step. Therefore, at least one binder selected from the group consisting of gelatin and a urea resin emulsion, and a pigment can be added to replenish the peeled pigment, thereby performing a surface treatment step. The surface treatment can also be performed by adding a water-soluble metal compound and a pigment.

An addition amount of the binder may be normally about 30 to 50 wt % to pigment. As the binder, gelatin and a urea resin emulsion can be used singly or in a combination thereof. When gelatin and the urea resin are to be used as a mixture, a weight ratio of gelatin to the urea resin is preferably 1:1 to 10:1. When the weight ratio falls within this range, a pigment can be strongly adhered on a phosphor to improve dispersibility of the phosphor.

The pigment is adhered mainly in order to improve contrast of a phosphor screen, and one having the same color as a luminescent color of a phosphor is normally used. Examples of the pigment are cobalt green and titanium green for a green emitting phosphor, ultramarine blue and cobalt blue for a blue emitting phosphor, and red iron oxide (colcothar) and yellow iron oxide for a red emitting phosphor.

A cohesive force between phosphors is often very strong in accordance with the type of recovered phosphor. Some recovered slurries have insufficient phosphor dispersibility to perform the above three steps. In order to reclaim such a phosphor, in addition to the above steps, a dispersion step can be performed by using a bead mill or a ball mill to disperse the phosphor. In this dispersion step, after the weak acid treatment step is performed, a phosphor is transferred to a mixer tank containing water and balls or beads and stirred for about 30 minutes. This step is effective especially for a recovered phosphor having a strong cohesive force or a phosphor on which a mass of PVA which is difficult to decompose is adhered.

According to the method of the present invention, in the decomposition treatment step, a phosphor slurry is heated up to, e.g., 70° C. or more, and PVA, ADC, and the like coated on the surface of a recovered phosphor can be softened. The phosphor is dispersed upon subsequent addition of an alkali, and the softened PVA, ADC, and the like are easily dissolved in a warm alkali suspension. When the phosphor is dispersed, carbon contained between phosphor particles is perfectly released in the suspension and it floats in the alkali suspension since it has a smaller specific gravity than that of the phosphor. The PVA, ADC, and the like softened by the alkali can be peeled by adding an oxidizing agent. In particular, an isocyanuric acid series oxidizing agent can be handled very easily since it is a powder and can peel solid PVA adhered on the phosphor with its strong oxidizing force. Thereafter, in the weak acid treatment step, an oxide or sulfide produced on the phosphor surface by an oxidizing agent can be removed, or other luminescent components can be removed upon recovery of a rare earth phosphor slurry. In the subsequent surface treatment step, dispersibility and coating properties of the phosphor can be improved.

As described above, according to the present invention, in the first decomposition treatment step, only a phosphor can be efficiently separated from a phosphor slurry containing carbon, a bichromate, and PVA, and an amount of an oxide produced on the surface of the phosphor can be minimized. In the second weak acid treatment step, a small amount of an oxide or sulfide produced on the phosphor surface can be effectively removed, and the state of the phosphor surface can be improved. In the third surface treatment step, dispersibility and coating properties of the phosphor can be improved. In particular, in the first decomposition treatment step, even a solid PVA strongly adhered on the phosphor can be decomposed and removed by using an isocyanuric acid series oxidizing agent. As a result, the dispersibility of the phosphor can be further improved. In addition, since a powdery oxidizing agent can be easily handled and is hardly scattered on a human body unlike a liquid agent, an operation can be safely performed.

According to the present invention as described above, there is provided a method of reclaiming a recovered phosphor, which can obtain a phosphor having improved brightness and dispersibility and good coating properties and can form a uniform phosphor screen.

EXAMPLES

The present invention will be described in more detail below by way of its examples.

Example 1

Pre-Treatment Step 300 l of ion exchange water (to be referred to as water hereinafter) were put in a tank, and a recovered blue emitting phosphor ZnS:Ag,Al (dry weight=200 kg) on which PVA, ADC, and the like were fixed was put in the tank while it was ground. Water was added to prepare a total amount of 500 l of a phosphor suspension, and the suspension was stirred for 30 minutes.

This suspension was flowed under stirring from the tank by opening a bottom valve of the tank and was passed through a nylon screen of 300 mesh to remove foreign substances and dust. The resultant suspension was contained in another tank.

Decomposition Treatment Step

Water was added to the phosphor suspension contained in the other tank to obtain a total amount of 600 l. 5 kg of NaOH were added as an alkali to the phosphor suspension under stirring, and a heated steam was blown to adjust a liquid temperature to be 75° C. 10 kg of $Na_2S_2O_8$ were added as an oxidizing agent to the phosphor suspension, and the suspension was stirred for 1.5 hours while the liquid temperature was kept at 75° C. Thereafter, the resultant phosphor suspension was left to stand to allow the phosphor to settle. After the phosphor satisfactorily settled, a side valve connected to the side surface of the tank was opened to discharge a supernatant containing the dissolved PVA, ADC, and the like.

Water was added to the remaining phosphor suspension to obtain a total amount of 800 l and the suspension was stirred for 10 minutes. The resultant phosphor suspension was left to stand to allow the phosphor to settle, and the side valve was opened to discharge a supernatant of the suspension, thereby washing the phosphor. The washing operation was repeated several times until the pH of the phosphor suspension was adjusted to be about 7.

Water was added to the resultant phosphor suspension to obtain a total amount of 500 l. While this phosphor suspension was stirred, the bottom valve of the tank was opened to pass the suspension through a screen of 300 mesh, thereby removing PVA and ADC which were not dissolved in an alkali and were peeled from the phosphor by the oxidizing agent. The resultant suspension wet-screened in this manner was contained in another tank.

Weak Acid Treatment Step

Water was added to the contained phosphor suspension to obtain a total amount of 600 l, and concentrated acetic acid was dropped in the phosphor suspension under stirring, thereby adjusting the pH of the suspension to be 4.2. This phosphor suspension was stirred for five minutes and left to stand to allow the phosphor to settle. Thereafter, as in the above decomposition treatment step, a washing operation was repeated several times until the pH was adjusted to be about 7, and the resultant suspension was contained in another tank.

Surface Treatment Step

Water was added to the resultant phosphor suspension to obtain a total amount of 600 l. 1 l of a 20-wt % water dispersion of colloidal silica (Ludox AM available from Du Pont de Nemours & Co. Inc.) having a grain size of about 20 nm and 1.2 l of a 17-wt % aqueous zinc sulfate solution were added to the phosphor suspension under stirring, and ammonia water was added to adjust the pH to be 7.4. The resultant phosphor suspension was stirred for 10 minutes to adhere silica on the phosphor surface. Thereafter, the phosphor suspension was left to stand to allow the phosphor to settle, and a washing operation was repeated several times until the pH was adjusted to be about 7 as in the above weak acid treatment step, thereby obtaining a phosphor suspension of a reclaimed phosphor.

Storage

Water was added to the resultant phosphor suspension, and the suspension was contained in another tank under stirring and stored in a state in which it contained water.

A portion of the stored phosphor suspension was dispensed, filtered, and dried to obtain a reclaimed phosphor, and relative brightness of the obtained regenerated phosphor was measured assuming that luminescent brightness of a new phosphor product was 100. In addition, PVA, ADC, and a surfactant were added at a normal ratio to prepare a reclaimed phosphor slurry, and its coating properties were measured.

That is, a volume average diameter (Dm) of the phosphor in the phosphor slurry and a settled volume of the phosphor obtained after 15 ml of the slurry were centrifuged at 1,000 rpm for 15 minutes were measured to evaluate the coating properties dispersibility of the phosphor. The results are summarized in a Table to be presented later. Dm is better as it is closer to that of a new product, and a smaller settled volume indicates better dispersibility of the phosphor.

An adhesive strength of the phosphor was evaluated as follows.

After the phosphor slurry was coated and dried on a faceplate, when a phosphor screen was to be exposed through a stripe-like shadow mask, a filter having a variable transmittivity was placed between an exposure light source and the shadow mask. A stripe width of the phosphor screen formed when it was exposed through a filter having a transmittivity of 100% was set to be 180 $\mu$m, and the transmittivity of the filter was gradually decreased to reduce an exposure amount. As the exposure amount was reduced, the stripe width of the phosphor screen was decreased, and peeling of stripes finally occurred. Therefore, the stripe width obtained when peeling of the stripes occurred was evaluated as the adhesive strength of the phosphor. That is, as the stripe width obtained when peeling started was smaller, the adhesive strength can be considered to be stronger.

Control 1

As Control 1, a phosphor was reclaimed by performing only the pre-treatment and decomposition treatment steps following the same procedures as in Example 1, and measurements were similarly performed. The results are summarized in the Table to be presented later.

Control 2

As Control 2, a phosphor was reclaimed by performing only the pre-treatment, decomposition treatment, and surface treatment steps following the same procedures as in Example 1, and measurements were similarly performed. The results are summarized in the Table to be presented later.

Example 2

Pre-Treatment Step

A pre-treatment was performed following the same procedures as in Example 1.

Decomposition Treatment Step

A decomposition treatment step was performed following the same procedures as in Example 1 except that 15 kg of isocyanuric acid were added as an oxidizing agent.

Weak Acid Treatment Step

A weak acid treatment step was performed following the same procedures as in Example 1.

Surface Treatment Step

A surface treatment step was performed following the same procedures as in Example 1.

Storage

A reclaimed phosphor was stored following the same procedures as in Example 1.

The obtained reclaimed phosphor was used to perform measurements following the same procedures as in Example 1. The results are summarized in the Table to be presented later.

Example 3

Pre-Treatment Step

A pre-treatment was performed following the same procedures as in Example 1 except that 200 kg (dry weight) of a ZnS:Cu,Au,Al green emitting phosphor were used as a recovered phosphor.

Decomposition Treatment Step

A decomposition treatment step was performed following the same procedures as in Example 1 except that 10 l of 30% $H_2O_2$ was added as an oxidizing agent.

Weak Acid Treatment Step

A weak acid treatment step was performed following the same procedures as in Example 1.

Surface Treatment Step 6.5 l of an aqueous aluminum nitrate solution containing 2.0 wt % of aluminum and 1 kg of colloidal silica used in Example 1 were added to the obtained phosphor suspension, and the pH of the suspension was adjusted to be 6.5 by using ammonia water and hydrochloric acid, thereby adhering these substances on the surface of the phosphor. Thereafter, a washing operation was performed following the same procedures as in Example 1 to obtain a phosphor suspension containing a reclaimed phosphor.

Storage

The reclaimed phosphor was stored following the same procedures as in Example 1.

The obtained reclaimed phosphor was used to perform measurements following the same procedures as in Example 1. The results are summarized in the Table to be presented later.

Control 3

As Control 3, a phosphor was reclaimed by performing only the pre-treatment and decomposition treatment steps following the same procedures as in Example 3, and measurements were similarly performed. The results are summarized in the Table to be presented later.

Control 4

As Control 4, a phosphor was reclaimed by performing only the pre-treatment, decomposition treatment, and surface treatment steps following the same procedures as in Example 3, and measurements were similarly performed. The results are summarized in the Table to be presented later.

Example 4

Pre-Treatment Step

A pre-treatment was performed following the same procedures as in Example 1 except that a recovered phosphor similar to that used in Example 3 was used.

Decomposition Treatment Step

A decomposition treatment step was performed following the same procedures as in Example 1 except that 12 kg of isocyanuric acid were added as an oxidizing agent.

Weak Acid Treatment Step

A weak acid treatment step was performed following the same procedures as in Example 1.

Surface Treatment Step

A surface treatment step was performed following the same procedures as in Example 3.

Storage

A reclaimed phosphor was stored following the same procedures as in Example 1.

The obtained reclaimed phosphor was used to perform measurements following the same procedures as in Example 1. The results are summarized in the Table to be presented later.

Example 5

Pre-Treatment Step

A pre-treatment was performed following the same procedures as in Example 1 except that 200 kg (dry weight) of a $Y_2O_2S:Eu,Sm$ red emitting phosphor was used as a recovered phosphor.

Decomposition Treatment Step

A decomposition treatment step was performed following the same procedures as in Example 1 except that 10 l of NaOCl (effective chlorine amount = 12%) were added as an oxidizing agent.

Weak Acid Treatment Step

Water was added to the resultant phosphor suspension to obtain a total amount of 600 l, and a heated steam was blown into the suspension under stirring in order to promote a reaction, thereby increasing a liquid temperature up to 70° C. Diluted hydrochloric acid was added to the resultant phosphor suspension to adjust a pH to be 4.0, and the suspension was stirred for 30 minutes while the liquid temperature was kept at 70° C.

After stirring, the phosphor suspension was left to stand to allow the phosphor to settle. Thereafter, a washing operation was performed following the same procedures as in Example 1.

Surface Treatment Step

Water was added to the resultant phosphor suspension to obtain a total amount of 600 l, and 1 l of 5-wt % methacrylic acid and 100 g of ammonium persulfate were added to the suspension under stirring. A heated steam was blown into the phosphor suspension to increase a liquid temperature up to 70° C., and the suspension was stirred for one hour. After stirring, the resultant phosphor suspension was left to stand to allow the phosphor to settle, and a washing operation was performed following the same procedures as in Example 1, thereby obtaining a phosphor suspension of a recovered phosphor.

Storage

A reclaimed phosphor was stored following the same procedures as in Example 1.

The reclaimed phosphor was used to perform measurements following the same procedures as in Example 1. The results are summarized in the Table to be presented later.

Control 5

As Control 5, a phosphor was reclaimed by performing only the pre-treatment and decomposition steps following the same procedures as in Example 5, and measurements were similarly performed. The results are summarized in the Table to be presented later.

Control 6

As a Control 6, a phosphor was reclaimed by performing only the pre-treatment, decomposition treatment, and surface treatment steps following the same procedures as in Example 5, and measurements were similarly performed. The results are summarized in the Table to be presented later.

Example 6

Pre-Treatment Step

A pre-treatment step was performed following the same procedures as in Example 1 except that a recovered phosphor similar to that used in Example 5 was used.

Decomposition Treatment Step

A decomposition treatment step was performed following the same procedures as in Example 1 except that 10 kg of trichloroisocyanuric acid were added as an oxidizing agent.

Weak Acid Treatment Step

A weak acid treatment step was performed following the same procedures as in Example 5.

Surface Treatment Step

A surface treatment step was performed following the same procedures as in Example 5.

Storage

A reclaimed phosphor was stored following the same procedures as in Example 1.

The obtained reclaimed phosphor was used to perform measurements following the same procedures as in Example 1. The results are summarized in the Table to be presented later.

Example 7

Pre-Treatment Step

A pre-treatment was performed following the same procedures as in Example 1 except that a phosphor slurry containing 200 kg of a red emitting phosphor $Y_2O_2S:Eu,Sm$ on which 0.3% of $Fe_2O_3$ were adhered and 700 ppm of a ZnS phosphor was used as a recovered emitting phosphor.

Decomposition Treatment Step

A decomposition treatment step was performed following the same procedure as in Example 1.

Weak Acid Treatment

A weak acid treatment step was performed following the same procedures as in Example 5.

Surface Treatment (Pigment Adhering) Step

A portion of a phosphor suspension of a washed phosphor was dispensed, filtered, and dried, and reflectivity of the obtained reclaimed phosphor and that of a new phosphor product were measured and compared with each other. As a result, about 40% of the adhered pigment were peeled or dissolved.

Therefore, water was added to the above phosphor-suspension to obtain a total amount of 600 l, and 240 g of red iron oxide, 60 g of gelatin, and 25 g of a urea resin emulsion were added to the suspension under stirring. Acetic acid was added to adjust a pH to be 5.0, and the resultant suspension was stirred for 30 minutes. After stirring, a washing operation was performed following the same procedures as in Example 1.

Storage

While the resultant phosphor suspension was stirred, a valve on the bottom of a tank was opened to pass the suspension through a Nutsche funnel in which a filter cloth was placed, and water was removed well to extract the phosphor. The extracted phosphor was dried by a dryer at 120° C. to obtain a phosphor attached with a pigment, and the obtained phosphor with a pigment was stored.

The obtained phosphor with a pigment was used to perform measurements following the same procedures as in Example 1. The results are summarized in the Table to be presented later.

Control 7

As Control 7, a phosphor was reclaimed by performing only the pre-treatment and decomposition treatment steps following the same procedures as in Example 7, and measurements were similarly performed. The results are summarized in the Table to be presented later.

Control 8

As Control 8, a phosphor was reclaimed by performing only the pre-treatment, decomposition treatment, and surface treatment (pigment adhering) steps following the same procedures as in Example 7, and measurements were similarly performed. The results are summarized in the Table to be presented later.

Example 8

Pre-Treatment Step

A pre-treatment step was performed following the same procedures as in Example 1 except that a recovered phosphor similar to that used in Example 7 was used.

Decomposition Treatment Step

A decomposition treatment step was performed following the same procedures as in Example 1.

Weak Acid Treatment Step

A weak acid treatment step was performed following the same procedures as in Example 5.

Surface Treatment Step

A surface treatment (pigment adhering) step was performed following the same procedures as in Example 7.

Storage

A reclaimed phosphor was stored following the same procedures as in Example 7.

The obtained reclaimed phosphor was used to perform measurements following the same procedures as in Example 1. The results are summarized in the Table to be presented later.

Example 9

Pre-Treatment Step

A pre-treatment was performed following the same procedures as in Example 1 except that 200 kg (dry weight) of a $Y_2O_2:Eu$ red emitting phosphor was used as a recovered phosphor. This recovered phosphor was not a slurry but almost a solid.

Decomposition Treatment Step

A decomposition treatment step was performed following the same procedures as in Example 1 except that 30 kg of isocyanuric acid ($C_3H_3N_3O_5$) were added as an oxidizing agent.

Weak Acid Treatment Step

A weak acid treatment step was performed following the same procedures as in Example 5.

Dispersion Step

After a washing operation of the obtained phosphor suspension was performed following the same procedures as in Example 1, the resultant suspension was transferred to a mixer mill containing beads and stirred for 30 minutes. After stirring, a lower valve of the mixer mill was opened to separate the phosphor suspension from the beads. This suspension was contained in another tank.

Surface Treatment Step

A surface treatment step was performed following the same procedures as in Example 5.

Storage

A reclaimed phosphor was filtered, dried, and stored following the same procedures as in Example 5.

The obtained reclaimed phosphor was used to perform measurements following the same procedures as in Example 1. The results are summarized in the Table to be presented later.

Control 9

As Control 9, a phosphor was reclaimed by performing only the pre-treatment and decomposition treatment steps following the same procedures as in Example 5, and measurements were similarly performed. The results are summarized in the Table to be presented later.

Control 10

As Control 10, a phosphor was reclaimed by performing only the pre-treatment, decomposition treatment, and surface treatment steps following the same procedures as in Example 5, and measurements were similarly performed. The results are summarized in the Table to be presented later.

TABLE

| | Relative Brightness (%) | Dm (μm) | Sedimentation Volume (ml) | Adhesive Strength (μm) |
|---|---|---|---|---|
| New Product | 100 | 7.7 | 3.2 | 140 |
| Example 1 | 98 | 7.5 | 3.0 | 130 |
| Example 2 | 98 | 7.2 | 2.9 | 125 |
| Control 1 | 97 | 8.9 | 4.5 | 165 |
| Control 2 | 97 | 7.7 | 3.5 | 145 |
| New Product | 100 | 7.7 | 3.3 | 135 |
| Example 3 | 98 | 7.5 | 3.1 | 125 |
| Example 4 | 98 | 7.2 | 2.8 | 120 |
| Control 3 | 97 | 8.9 | 4.2 | 155 |
| Control 4 | 97 | 7.9 | 3.5 | 135 |
| New Product | 100 | 8.3 | 3.2 | 135 |
| Example 5 | 95 | 8.0 | 2.9 | 120 |
| Example 6 | 94 | 7.6 | 2.5 | 115 |
| Control 5 | 97 | 9.5 | 4.4 | 160 |
| Control 6 | 97 | 8.5 | 3.5 | 135 |
| New Prduct | 100 | 8.3 | 3.3 | 130 |
| Example 7 | 94 | 8.6 | 3.5 | 120 |
| Example 8 | 95 | 8.2 | 3.2 | 115 |
| Control 7 | 96 | 9.4 | 4.6 | 155 |
| Control 8 | 96 | 8.8 | 3.7 | 130 |
| New Product | 100 | 8.0 | 3.2 | 140 |
| Example 9 | 95 | 8.2 | 3.2 | 125 |
| Control 9 | 95 | 9.1 | 4.5 | 160 |
| Control 10 | 95 | 8.8 | 4.0 | 135 |

As is apparent from the Table, all of a relative brightness, a Dm value, a sedimentation volume, and an adhesive force are good in each of Examples 1 to 9, while a Dm value and a sedimentation volume are increased and an adhesion force is very poor when the weak acid treatment and the surface treatment step are not performed (Control 1, 3, 5, 7, and 9).

When the weak acid treatment is not performed (Control 2, 4, 6, 8, and 10), a reclaimed phosphor close to a new product can be obtained since a surface treatment substance is adhered on the phosphor. By performing the weak acid treatment step as in Examples 1 to 9, however, an oxide or sulfide on the phosphor surface is removed to improve the surface state of the phosphor. As a result, the adhered surface treatment substance can satisfactorily achieve its effect to realize a phosphor having improved dispersibility and coating characteristics. In particular, although it was not expected, coating properties better than those of a new phosphor product could be achieved in adhesive strength.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of reclaiming a zinc sulfide phosphor from a recovered phosphor slurry containing carbon, a bichromate, and polyvinyl alcohol, said method comprising the successive steps of:
   (a) adding water to a recovered phosphor slurry, heating the recovered phosphor slurry to a temperature of at least 70° C., adding an alkali to said recovered phosphor slurry to adjust the alkali concentration in the slurry to be not more than 0.5N, adding an oxidizing agent in an amount of 0.1 to 20.0 wt % with respect to a dry solid component of said slurry, whereby said carbon and bichromate are separated from a phosphor in said recovered phosphor slurry and said polyvinyl alcohol is decomposed and dissolved into said alkali, removing an alkali solution containing said carbon, bichromate and decomposed polyvinyl alcohol from the remaining phosphor slurry, and washing said recovered phosphor slurry with water; and thereafter
   (b) treating the phosphor slurry with an acid by adding an acid solution to the phosphor slurry to adjust the pH of the slurry to be 3.0 to 5.0, thereby cleaning the phosphor in the slurry,
   (c) removing the acid in step (b) and washing the slurry with water and retreating the surface of the phosphor by adding a water soluble compound containing at least one element selected from the group consisting of Zn, Al and alkaline earth metals and at least one member selected from the group consisting of colloidal silica, alumina sol and titania sol, each having a grain size of not more than 50 nm to the washed slurry, and thereafter adjusting the pH to 6.5 to 7.5 to effect coprecipitation of said at least one element and said at least one member onto the surface of the phosphor.

2. A method according to claim 1 wherein said oxidizing agent is a member selected from the group consisting of $Na_2S_2O_8$, $H_2O_2$, NaOCl, $C_3H_3N_3O_3$.

3. A method according to claim 1, wherein said alkali is at least one member selected from the group consisting of NaOH, KOH, LiOH, $Na_2CO_3$, $K_2CO_3$ and $NH_4OH$.

4. A method according to claim 1, further comprising, after said step (b), the step of dispersing said phosphor by a ball mill or a bead mill.

5. The method according to claim 1, wherein an amount of said alkali added is at least 1.0 wt % with respect to a dry solid component in said recovered phosphor slurry.

6. The method according to claim 1, wherein said acid solution is selected from the group consisting of diluted sulfuric acid, diluted hydrochloric acid and concentrated acetic acid.

* * * * *